United States Patent [19]

Schaefer

[11] 4,088,250
[45] May 9, 1978

[54] INSULATING CONTAINER CARRIER AND ADAPTOR

[76] Inventor: Donald J. Schaefer, 3127 Greenbriar Dr., Glenview, Ill. 60025

[21] Appl. No.: 676,532

[22] Filed: Apr. 12, 1976

[51] Int. Cl.² ............................ A45F 3/16; A45F 5/00
[52] U.S. Cl. .............................. 224/5 W; 215/100 R; 220/85 H; 224/26 R; 224/32 R; 224/39; 224/42.4 G R; 248/315
[58] Field of Search ........ 224/5 W, 42.45 R, 42.46 R, 224/29 R, 29 B, 42.42 R, 30 R, 32 R, 39 R; 248/311 R, 311.1, 224.2, 223.4, 230, 314, 315; 220/85 H, 3.1, 18, 9 F; 108/44, 45; 215/100.5, 100 R

[56] References Cited

U.S. PATENT DOCUMENTS

| 1,404,755 | 1/1922 | Gay | 248/315 X |
|---|---|---|---|
| 2,719,414 | 10/1955 | Davis | 248/311.1 X |
| 2,926,879 | 3/1960 | Dietrich | 248/311.1 |
| 3,013,691 | 12/1961 | Prentice | 220/85 H |
| 3,121,508 | 2/1964 | Kase | 224/26 R UX |
| 3,155,260 | 11/1964 | Widener | 220/9 F UX |
| 3,881,677 | 5/1975 | Ihlenfeld | 248/311.1 |
| 3,990,617 | 11/1976 | Carter | 224/26 R X |

Primary Examiner—Trygve M. Blix
Assistant Examiner—Jerold M. Forsberg
Attorney, Agent, or Firm—Hill, Gross, Simpson, Van Santen, Steadman, Chiara & Simpson

[57] ABSTRACT

An insulating carrier for containers comprises a receptacle adapted to receive and enclose a container holding hot or cold contents to be kept at substantially a desired temperature for an extended length of time. The receptacle includes a generally cup-shaped open-topped body formed from insulating foam plastic material and providing an upwardly opening container-receiving chamber. An external generally radially extending and axially elongated lug handle on the receptacle body is adapted for assembly of an adaptor for mounting the carrier on a support. The adaptor includes a body portion for engaging the lug handle of the receptacle, and has means for securing the adaptor to the receptacle body and means for attaching the adaptor to a support on which the carrier is to be mounted. A neck on the upper end of the receptacle body projects upwardly above the upper end of the lug handle, and an insulating cover for closing the open top of the body has a skirt flange for retaining engagement with the neck. When removed from the top of the receptacle body, the cap is adapted to be engaged for safekeeping or as a coaster with the bottom of the receptacle body.

18 Claims, 15 Drawing Figures

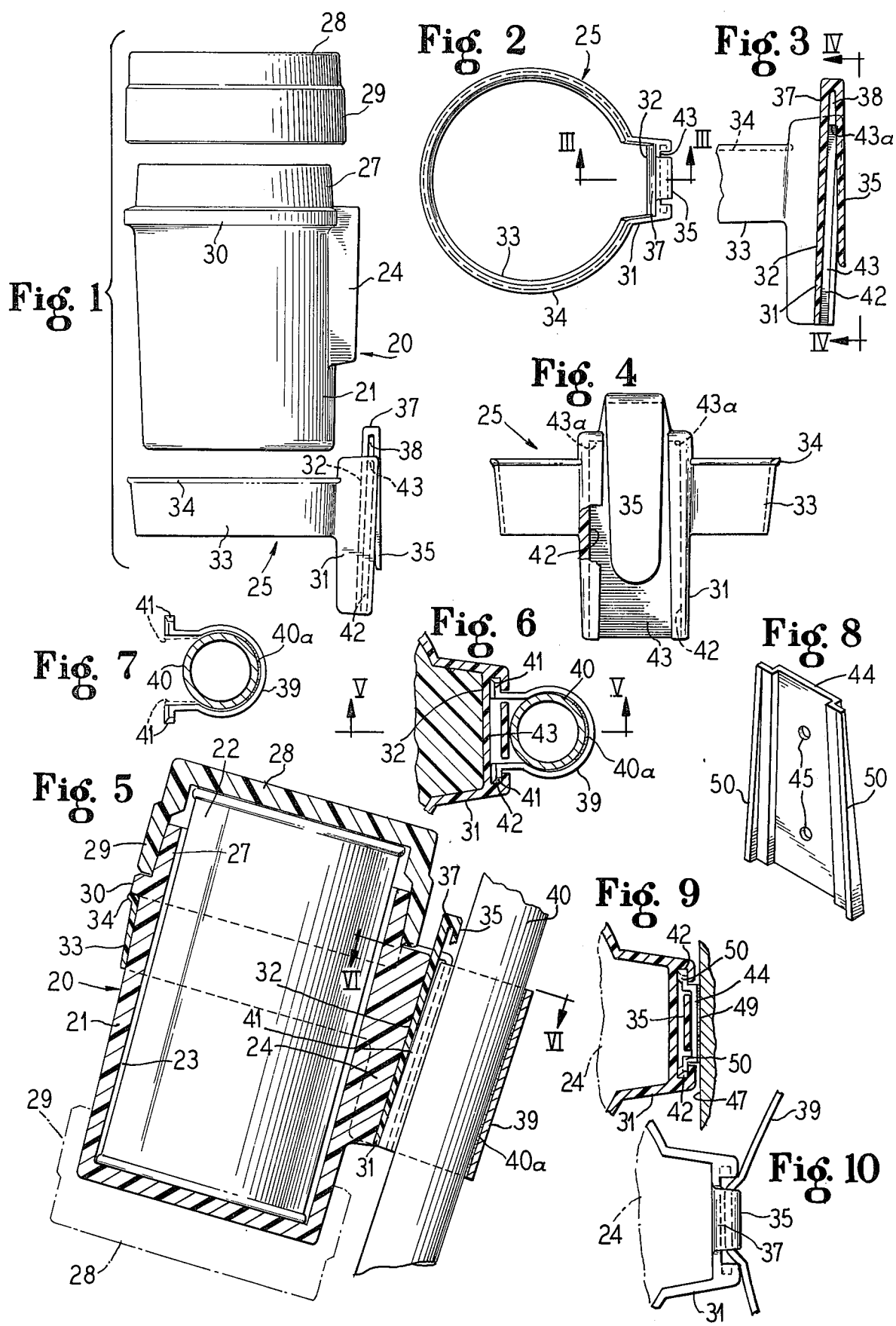

U.S.Patent  May 9, 1978  Sheet 2 of 2  4,088,250
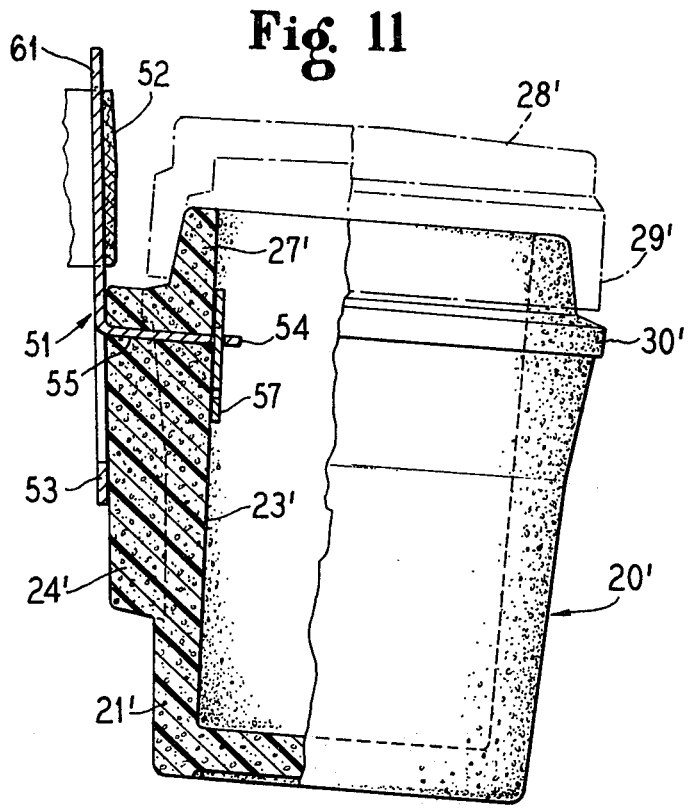
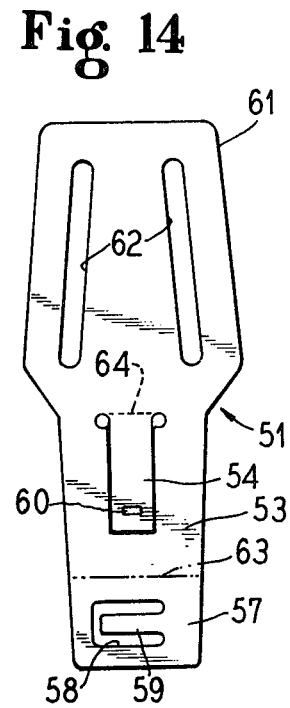
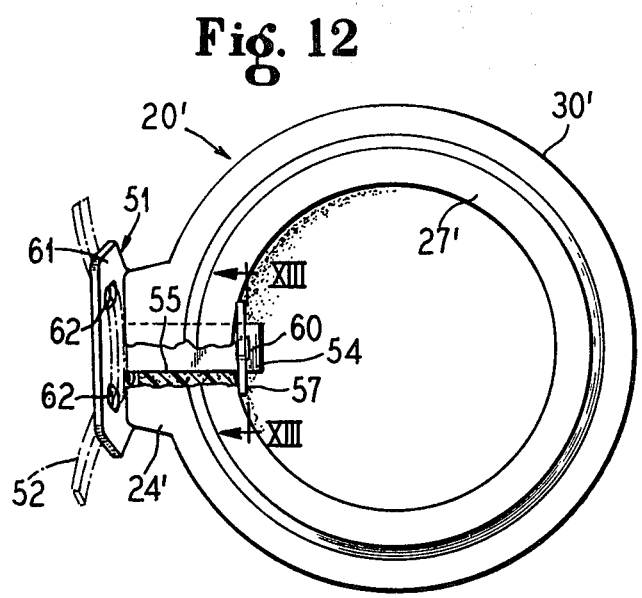
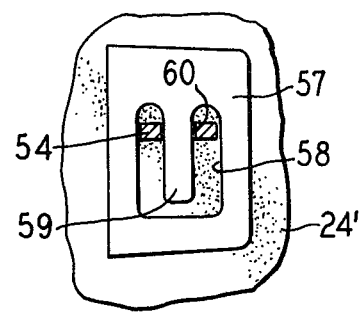
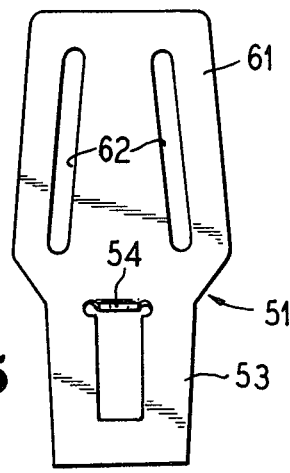

INSULATING CONTAINER CARRIER AND ADAPTOR

This invention relates to carriers, and is more particularly concerned with an insulating container carrier and adaptor.

Numerous and varied carriers for canned or bottle goods, and various and sundry supporting expedients have been proposed heretofore, particularly for quantity carrying of containers, but there has been a paucity of proposals for carriers which will enable a person to transport conveniently a moderate sized container holding hot or cold contents to be kept at substantially a desired temperature for an extended length of time such as during bicycling, golfing, motoring, boating, hiking, relaxing on lawn or poolside furniture, and the like.

By way of example, U.S. Pat. No. 3,840,153 is referred to for a showing of a supporting bracket for mounting of a specialized beverage container. U.S. Pat. No. 3,313,508 provides a thermos bottle bracket for attachment to a golf cart handle. U.S. Pat. No. 3,369,723 provides a vacuum bottle holder for attachment to a person's belt. U.S. Pat. No. 3,463,436 discloses an open-topped coaster and beaded chain connection to a tubular chair frame. All of these devices are strictly specialized and limited in their manner of attachment to a specific supporting structure such as a tubular member or a belt and do not provide for any choice or flexibility as to the supporting structure to which to be applied. Thermos or vacuum bottles are notoriously fragile. An open-topped carrier or coaster exposes its contents to the ambient atmosphere temperature and cannot hold a differential temperature of the contents for any appreciable time.

An important object of the present invention is to overcome the disadvantages, deficiencies, inefficiencies, shortcomings and problems inherent in prior devices and to provide a new and improved insulating carrier for containers, and also new and improved adaptor means for mounting the carrier on a support.

Another object of the invention is to provide a new and improved insulating carrier for containers and which will receive and enclose a container holding hot or cold contents to be kept at substantially a desired temperature for an extended length of time.

A further object of the invention is to provide a new and improved insulating carrier for containers, having novel reinforcing lug handle means for assembly with an adaptor for mounting the carrier on a support.

Still another object of the invention is to provide a new and improved insulating foam plastic carrier for containers, having novel closure cap means.

Yet another object of the invention is to provide new and improved adaptor means for mounting an insulating container carrier on a support.

It is also an object of the invention to provide a new and improved adaptor for mounting a container carrier on any of a plurality of different selected supports.

According to features of the invention, an insulating carrier for containers is provided, comprising a receptacle adapted to receive and enclose a container holding hot or cold contents to be kept at substantially a desired temperature for an extended length of time, the receptacle including a generally cup-shaped open-topped body formed from insulating foam plastic material and providing an upwardly opening container-receiving chamber of substantial axial as well as radial dimensions, and an external generally radially extending and axially elongated reinforcing lug handle on the body adapted for assembly with an adaptor for mounting the carrier on a support.

The adaptor includes a body portion for engaging the lug handle of the carrier body, and the adaptor body portion has means for securing the adaptor to the receptacle body and means for attaching the adaptor to a support on which the carrier is to be mounted.

A neck on the upper end of the body of the carrier projects upwardly above the upper end of the lug handle, and an insulating cover for closing the open top of the body has a skirt flange for retaining engagement with the neck.

Other objects, features, and advantages of the invention will be readily apparent from the following description of certain representative embodiments thereof, taken in conjunction with the accompanying drawings although variations and modifications may be effected without departing from the spirit and scope of the novel concepts embodied in the disclosure and in which:

FIG. 1 is an exploded elevational assembly view of a carrier and an adaptor embodying features of the invention.

FIG. 2 is a top plan view of the adaptor.

FIG. 3 is a vertical sectional detail view taken substantially along the line III—III of FIG. 2.

FIG. 4 is a rear elevational view partially in section taken substantially in the plane of line IV—IV of FIG. 3.

FIG. 5 is a vertical sectional elevational view taken substantially along the line V—V of FIG. 6, and showing the adaptor attached to a tubular support.

FIG. 6 is a sectional detail view taken substantially along the line VI—VI of FIG. 5.

FIG. 7 is a view similar to FIG. 6 and showing the adaptor attachment clip before assembly of the adaptor therewith.

FIG. 8 is an isometric view of a bracket for attachment of the adaptor to a flat vertical surface.

FIG. 9 is a horizontal sectional detail view showing the bracket of FIG. 8 attached to the surface and the adaptor connected thereto.

FIG. 10 is a fragmentary top plan view showing the adaptor attached to a strap such as a belt or golf bag retaining strap.

FIG. 11 is a side elevational view, partially in section, of a modification embodying features of the invention.

FIG. 12 is a top plan view, partially broken away and in section of the structure in FIG. 11.

FIG. 13 is a sectional elevational view taken substantially along the line XIII—XIII of FIG. 12.

FIG. 14 is a plan view of a stamped blank produced in the course of making the adaptor employed in FIGS. 11–13; and FIG. 15 is a plan view of the principal part of the stamped adaptor after it is completed and ready for use.

On reference to FIG. 1, an insulating container carrier 20 comprises a receptacle 21 adapted to receive and enclose a container 22 holding hot or cold contents to be kept at substantially a desired temperature for an extended length of time. By way of example, the container 22 may be a 12oz. beverage can as shown or other type of beverage container either for hot or cold beverage or it may be a container for hot or cold food product.

In a desirable construction, the receptacle 21 comprises a generally cup-shaped open-topped body formed from insulating foam plastic material such as aerated, multicellular, lightweight substantially rigid polystyrene plastic. Within the receptacle body 12 is an upwardly opening container-receiving chamber 23 of substantially axial as well as radial dimensions so as to accommodate the container 22 reasonably closely but freely and with the top of the container 22 projecting sufficiently above the top of the body 21 to permit ready digital grasping of the container for removal from the receptacle. Manufacture of the receptacle 21 may be effected by means of suitable molding techniques as is customary with the foam plastic material from which it is made.

An external generally radially extending and axially elongated reinforcing lug handle 24 on the receptacle body 21 is adapted for assembly with an adaptor 25 for mounting the carrier 20 on a support. In a preferred form, the lug handle 24 is molded integrally in one piece with the body 21 and extends throughout a substantial portion of the length of the body 21 but is spaced from the closed base end of the body. Projecting above the upper end of the lug handle 24 on the upper end of the body 21 is a neck 27 of substantial length and slightly tapered frustoconically upwardly. An insulating cover 28 for closing the open top of the body 21 has a skirt flange 29 complementary to and retainingly engageable with the tapered neck 27. The cap closure 28 is preferably made from the same material as the body 21 and the engagement surfaces of the neck 27 and the flange 29 are preferably on straight taper and frictionally engageable with sufficient slip press fit grip when assembled to substantially resist unintentional separation, but may be pulled apart with reasonable separating force. A stop against overzealous forced application of the cover 28 is provided on the body 21 is by an annular rib 30 having its upper edge in a plane with the top of the lug handle 24. The rib 30 also serves as a reinforcement about the upper portion of the body 21. By having the lower portion of the body 21 tapering downwardly and inwardly on its outer perimeter such that the lower end portion of the circular wall matches the taper on the inner surface of the skirt flange 29, the cover 28 is adapted to be applied to the bottom of the carrier body 21 with a reasonably snug slip press fit when not in use whereby the flat crown surface of the cover enables it to serve as a coaster for the carrier 20 and in any event maintains the cover against misplacement and in a handy position for retrieval replacement on the top of the carrier.

In a preferred construction, the adaptor 25 is adapted to mount the carrier 20 on several different types of supports. As a principal component the adaptor 25 comprises a body portion 31 for enaging the lug handle 24. A recess 32 (FIGS. 1 and 2) is dimensioned complementary to the lug handle 24, including the slight downward and inward oblique slant of the outer surface of the handle which thus seats on a complementary seating surface on the adaptor body portion 31 as best visualized in FIG. 5. Means carried by the body portion 31 and comprising a collar 33 secures the adaptor 25 to the receptacle body in assembly. For this purpose the collar 33 has an inside diameter conforming to the diameter of the carrier body 21 contiguous to the collar rib 30. About its upper edge, the collar 33 is desirably provided with a reinforcing bead 34 adapted to engage the underside of the rib 30. In addition the inner axial surface of the collar 33 is tapered complementary to the taper of the perimeter of the carrier body 21 adjacent to the underside of the rib 30. As a result, assembly of the adaptor 25 with the carrier 20 is easily effected by relative movement from the lever or bottom end of the carrier upwardly until snug engagement is attained between the adaptor body 31 and the handle lug 24 and of the collar 33 with the body 21 and the rib 30. As will be best observed in FIG. 5, this interengagement of the body 21 and the collar 33 of the adaptor 25 is above the horizontal center of the body 21 so that the center of mass of the carrier is below the adaptor. The adaptor body portion 31 extends in engagement with the upper and lower portions of the lug handle 24 and provides a lateral stabilizing relation between the receptacle 21 and the adaptor 25, especially when the rceptacle carries the weight of the filled container 22. A stable positive support is thus provided for the carrier by the adaptor 25.

Means are carried by the adaptor body portion 31 for attaching the adaptor to a support on which the carrier 20 is to be mounted. In one form, the attaching means comprises a belt clip 35 (FIGS. 1–4 and 10). This clip is desirably in the form of a resiliently flexible depending tongue-like element extending downwardly from an upward projection 37 on the outer side of the adaptor body 31 and defining with the body a strap- or belt-receiving downwardly opening slot 38. Normally the tongue clip diverges slightly from the connecting projection 37 so as to facilitate engagement by a downward assembly maneuver with a users belt or golf bag holding strap 39 or the like, (FIG. 10). At least the upper portion of the tongue 35 (FIGS. 3, 5, 6 and 10) is located between and inwardly relative to spaced edges on the body portion 31, and such edges cooperate with the tongue as slip checking means, restraining relative displacement of the device relative to the belt or strap 39 gripped by the tongue and drawn against the edges. In a preferred construction, the belt clip 35 is molded integrally with the body 31, as is also the collar 33. For this purpose the adaptor may be made from a suitable moldable plastic material such as polypropylene or polyethylene.

Another form of attaching means comprise a clip 39 (FIGS. 5–7) by means of which the adaptor 25 is adapted to be attached to a cylindrical tubular structure 40 such as a generally upright bicycle frame bar, upright tubular bar of lawn or poolside furniture, boat railing, golf cart, and the like. In a preferred form, the clip 39 comprises a resilient generally semi-circular body band which will engage about the perimeter of the bar 40 more than 180°. If desired, the clip 39 may be affixed to the bar 40 as by suitable adhesive means 40a. For reception of the bar 40 within the body of the clip 39 the opposite portions of the clip are spaced apart and resiliently flexible with the body of the clip so that the clip can be snapped into position on the bar. For connecting the clip 39 to the adaptor body 31, the opposite end portions of the clip are provided with coupling means in the form of laterally oppositely projecting flanges 41 engageable within complementary coupling, retaining grooves 42 in integral vertical ribs along opposite sides of a longitudinal recess 43 in the outer side of the body portion 31 providing a clearance into which the belt clip tongue 35 is adapted to be resiliently deflected when the device is mounted on the bar and effects a tightening thrust reaction between the clip flanges 41 and surfaces in the grooves 42 (FIG. 6). As best visualized in FIG. 5, the clip 39 is preferably of about the same width between its opposite edges as the length of the adaptor body portion 31 and the attachment flanges 41 are of the same length as the body of the clip. In order to cramp the clip 39 snuggly on and about the bar 40, the construction and relationship of the clip is such that in final assembly with the adaptor body 31 the opposite end portions of the clip are stessed toward one another as indicated in dash line, whereby to draw the body of the clip firmly onto the bar 40 and to tension the clip legs for firm retention of the body 31. For this purpose the root surfaces defining the grooves 42 taper slightly convergently toward one another as the clip and the adaptor body 31 are brought into final assembled relation. In the final assembly, respective stop shoulders 43a (FIG. 4) at the upper ends of the grooves 42 are engaged by the top ends of the flanges 41 to maintain the clip and the adaptor in the desired fully assembled relationship from which the adaptor body can be readily lifted upward manipulation. By having the clip 39 formed from similar plastic material as the rest of the adaptor 25, a reasonably firm frictional interengagement of the clip and the body portion 31 is maintained against unintentional separation of the elements.

Attachment of the adaptor 25 to an upright flat surface is adapted to be effected by means of a low profile bracket 44 (FIGS. 8 and 9) comprising a plate to be secured to the flat surface as by means of screws (not shown) extending through suitable screw holes 45. If preferred, the bracket plate 44 may be secured to a surface 47 as by means of a suitable adhesive 49 such as may be supplied by double-faced pressure-sensitive tape. The length of the bracket plate 44 is preferably substantially the same length of the adaptor body porton 31, and angular longitudinal side coupling flanges 50 on the bracket plate are complementary to the coupling grooves 42 and received in the grooves by downward relative assembly movement of the adaptor body portion 31 relative to the bracket 44 until the upper ends of the retainer flanges 50 engage the stop shoulders 43a. By virtue of the offset relationship of the retainer flanges 50 to the body of the bracket 44 the inwardly deflected belt clip tongue 35 is readily accommodated as best visualized in FIG. 9.

In the modification shown in FIGS. 11–15, an insulating container carrier 20' substantially like the carrier of FIG. 1 is similarly provided with a generally cup-shaped open-topped body 21' formed from insulating foam plastic material and providing an upwardly opening container-receiving chamber 23' of substantial axial as well as radial dimensions having an external generally radially extending and axially elongating reinforcing lug handle 24' adapted for assembly with an adaptor 51 for mounting the carrier on a support such as a belt or strap 52. Aligned with the top of the lug handle 24' is an annular rib 30' above which a neck 27' is adapted to receive a closure cap cover 28' provided with a neck engaging skirt flange 29'.

In a simple, inexpensive form, the adaptor 51 comprises a generally flat body portion 53 for engaging the lug handle 24'. Means for securing the adaptor 51 to the receptacle body 21' comprise a tongue 54 extending laterally from the plane of the body portion 53 and received through a complementary horizontal slot 55 extending through the upper portion of the lug handle 24' and the body 21' into the chamber 23' into which the distal end portion of the tongue 54 projects. For locking the tongue 54 in the assembled relation, a fastening clip 57 is provided in the form of a plate-like member having an opening 58 (FIG. 13) through which the tongue 54 extends for engagement of a locking finger 59 on the retainer clip through a complementary locking aperture 60 in the tongue. Through this arrangement, after the tongue 54 has been projected fully through the slot 55, the retaining clip 57 is applied by receiving the end portion of the tongue 54 into the opening 58 under the tip of the finger 59 and then pressing down to engage the finger through the aperture 60. The length of the tongue 54 between the body portion 53 and the aperture 60 is predetermined to be fairly closely related to the distance between the outer most surface of the lug handle 54' and the wall surface defining the chamber 23' adjacent to the location of the slot 55 in the upper end portion of the body 21' and the lug handle 24' immediately below the rib 30', that is at the strongest wall section of the body 21'.

Projecting upwardly on the adaptor body portion 53 are means in the form of a preferably somewhat wider attachment extension 60 (FIGS. 11 and 12) adapted for attaching the adaptor to a support comprising the strap or belt 52. For this purpose, the attaching extension 60 is preferably somewhat wider than the remainder of the body portion 53, and is provided with a pair of longitudinally extending spaced substantially coextensive elongated slots 61 through which the belt 52 is threaded for carrying the carrier assembly 20'.

In an economical construction, the adaptor 51 is fabricated by stamping from suitable gauge sheet polyethylene or polypropylene plastic wherein the clip 57 is formed as a lower end extension piece on the body portion 53 and then sheared off along a line 62. In the stamping operation all of the several apertures are formed in the parts and the tongue 54 is partially severed from the body portion 53 whereafter the tongue 54 is bent along a line 63 into the preferred angular position relative to the body portion 53, as best visualized in FIGS. 11, 12 and 15.

It will be understood that variations and modifications may be effected without departing from the spirit and scope of the novel concepts of this invention.

I claim as my invention:

1. In a container carrier comprising an assembly of an insulating receptacle adapted to receive and enclose a container holding hot or cold contents to be kept at substantially a desired temperature for an extended length of time, and a separable adaptor for mounting the carrier on a support:

said receptacle including a generally cup-shaped open-topped body formed from insulating foam plastic material and providing an upwardly opening container-receiving chamber of substantial axial as well as radial dimensions;

an external generally radially extending and axially elongate reinforcing lug handle of substantial length integral with said receptacle body and having its upper end near the top of said body such that when said carrier is manipulated by means of said lug handle the center of gravity is substantially lower than said upper end of said lug handle;

said adaptor having an axially elongate body portion provided with an axially extending recess shaped substantially complementary to said lug handle for embracingly engaging said lug handle of said receptacle;

the upper part of said adaptor body portion connected to a collar for encircling an upper portion of said receptacle body;

said receptacle body and said adaptor having complementary surfaces cooperating to maintain the receptacle and adaptor assembly with the center of gravity of the receptacle body and any contents therein substantially below said collar;

said adaptor body portion extending in engagement with the upper and lower portions of said lug handle and providing a lateral stabilizing relation between the receptacle and the adaptor especially when the receptacle carries the weight of a filled container;

and means carried by said adaptor body portion for supported attaching of the adaptor selectively to belt-like and bracket type supports.

2. A carrier according to claim 1, including a neck on the upper end of said receptacle body projecting upwardly above the upper end of said lug handle, and an insulating cover for closing the open top of the body, said cover having a skirt flange for retaining engagement with the outer surface of said neck.

3. A carrier according to claim 2, wherein said neck and said cover skirt flange have tapered slip fit frictional complementary retaining engagement surfaces.

4. A carrier according to claim 3, wherein said carrier body has at least its bottom end portion of tapered form complementary to the tapered surface of said cover skirt flange so that said cover skirt flange is engageable retainingly in slip fit frictional engagement with the bottom end portion of said receptacle body to serve as a coaster or merely to maintain the cover in a quick retrieval position.

5. A carrier according to claim 1, including a reinforcing rib encircling said body generally aligned with the upper end of said lug handle, said neck projecting upwardly above the lug handle and said rib.

6. A carrier according to claim 1, wherein said receptacle body has a reinforcing rib thereabout aligned with the top of said lug handle, and said adaptor collar engages under said rib.

7. An adaptor according to claim 6, wherein said collar has said bead engageable under a reinforcing rib on the receptacle body.

8. An adaptor according to claim 1, wherein said attaching means comprise a strap or belt engaging tongue, and slip checking means at opposite sides of the tongue to restrain displacement of the attaching means relative to the strap or belt.

9. A combination according to claim 1, wherein said means for attaching the adaptor to a support comprises a clip tongue extending downwardly from an upward projection on the outer side of the adaptor body opposite to said recess and defining with the body a strap or belt receiving downwardly opening slot, and slip checking means at opposite sides of the clip tongue to restrain displacement of the attaching means relative to the strap or belt.

10. A combination according to claim 9, wherein said slip checking means comprise longitudinal ribs provided with edges in spaced adjacency to the sides of the tongue.

11. A combination according to claim 10, wherein said ribs define a longitudinal recess therebetween, said ribs having longitudinal supporting clip flange receiving grooves opening into said recess, and said tongue being resiliently deflectable into said recess.

12. A combination accordinbg to claim 11, including stop shoulders facing downwardly at the upper ends of said grooves.

13. An adaptor according to claim 1, wherein said means for attaching the adaptor to a support comprises a clip tongue extending downwardly from an upward projection on the outer side of the adaptor body opposite to said recess and defining with the body a strap or belt receiving downwardly opening slot, and slip checking means at opposite sides of the clip tongue to restrain displacement of the attaching means relative to the strap or belt.

14. An adaptor according to claim 13, wherein said slip checking means comprise longitudinal ribs provided with edges in spaced adjacency to the sides of the tongue.

15. An adaptor according to claim 14, wherein said ribs define a longitudinal recess therebetween, said ribs having longitudinal supporting clip flange receiving grooves opening into said recess, and said tongue being resiliently deflectable into said recess.

16. An adaptor according to claim 15, including stop shoulders facing downwardly at the upper ends of said grooves.

17. An adaptor according to claim 1, wherein said attaching means comprise structure retainingly engageable with a support, and means cooperating with said structure for frictionally restraining displacement of the attaching means relative to the support.

18. In a container comprising an assembly of an insulating receptacle adapted to receive and enclose a container holding hot or cold contents to be kept at substantially a desired temperature for an extended length of time, and a separable adaptor for mounting the carrier on a support:

the receptacle includng a generally cup-shaped open-topped body formed from insulating foam plastic material and providing an upwardly opening container-receiving chamber of substantial axial as well as radial dimensions;

an external generally radially extending and axially elongate solid reinforcing lug handle of substantial length integral throughout its length with said receptacle body and having its upper end near the top of said body such that when the carrier is manipulated by means of the lug handle the center of gravity is substantially lower than said upper end of the lug handle;

the adaptor having an elongate body portion having a surface seating on a complementary seating surface on said lug handle;

means for securing the adaptor body to the receptacle comprising a tongue projecting from said adaptor body portion;

said lug handle and said receptacle body having a slot through which said tongue projects and with the free end of the tongue within said chamber;

a retaining clip attached to the portion of the tongue within the chamber and locking the adaptor in place on the reinforcing lug handle;

and means on the adaptor body portion for attaching the adaptor to a support on which the carrier is to be mounted.

* * * * *